(12) United States Patent
Sun et al.

(10) Patent No.: US 11,729,135 B2
(45) Date of Patent: Aug. 15, 2023

(54) INFORMATION PROCESSING APPARATUS AND NON-TRANSITORY COMPUTER READABLE MEDIUM FOR DETECTING UNAUTHORIZED ACCESS

(71) Applicant: FUJIFILM Business Innovation Corp., Tokyo (JP)

(72) Inventors: Ye Sun, Kanagawa (JP); Tatsuo Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 327 days.

(21) Appl. No.: 17/106,165

(22) Filed: Nov. 29, 2020

(65) Prior Publication Data

US 2021/0377218 A1 Dec. 2, 2021

(30) Foreign Application Priority Data

May 29, 2020 (JP) .................................. 2020-094038

(51) Int. Cl.
| | |
|---|---|
| H04L 29/06 | (2006.01) |
| H04L 61/4511 | (2022.01) |
| H04L 9/40 | (2022.01) |
| G06F 18/214 | (2023.01) |
| H04L 101/69 | (2022.01) |

(52) U.S. Cl.
CPC ........ H04L 61/4511 (2022.05); G06F 18/214 (2023.01); H04L 63/0236 (2013.01); H04L 63/101 (2013.01); H04L 63/107 (2013.01); H04L 2101/69 (2022.05)

(58) Field of Classification Search
CPC . H04L 63/0236; H04L 63/101; H04L 63/107; H04L 2101/69; H04L 61/4511; H04L 63/10; H04L 63/1416; H04L 63/145; G06K 9/6256; G06N 3/0454; G06N 3/088

See application file for complete search history.

(56) References Cited

U.S. PATENT DOCUMENTS

| | | | |
|---|---|---|---|
| 2007/0220605 A1* | 9/2007 | Chien | G06F 21/552 |
| | | | 726/23 |
| 2018/0270254 A1* | 9/2018 | Chiba | G06F 21/55 |
| 2019/0095301 A1 | 3/2019 | Sim et al. | |
| 2019/0327252 A1* | 10/2019 | Grothendieck | H04L 63/1425 |
| 2021/0160257 A1* | 5/2021 | Elyashiv | H04L 63/1425 |

FOREIGN PATENT DOCUMENTS

| | | |
|---|---|---|
| JP | 6078179 | 2/2017 |
| JP | 2017-130037 | 7/2017 |
| JP | 2018-133004 | 8/2018 |
| JP | 2019061647 | 4/2019 |

* cited by examiner

*Primary Examiner* — Harunur Rashid
(74) *Attorney, Agent, or Firm* — JCIPRNET

(57) ABSTRACT

An information processing apparatus includes a processor configured to detect unauthorized access from a subject terminal to a subject host as a result of inputting subject input data into an autoencoder, an Internet protocol address of the subject terminal and an Internet protocol address of the subject host being used as at least part of the subject input data, the autoencoder having performed learning by using learning data, an Internet protocol address of a terminal and an Internet protocol address of a host to which the terminal has connected being used as at least part of the learning data.

6 Claims, 3 Drawing Sheets

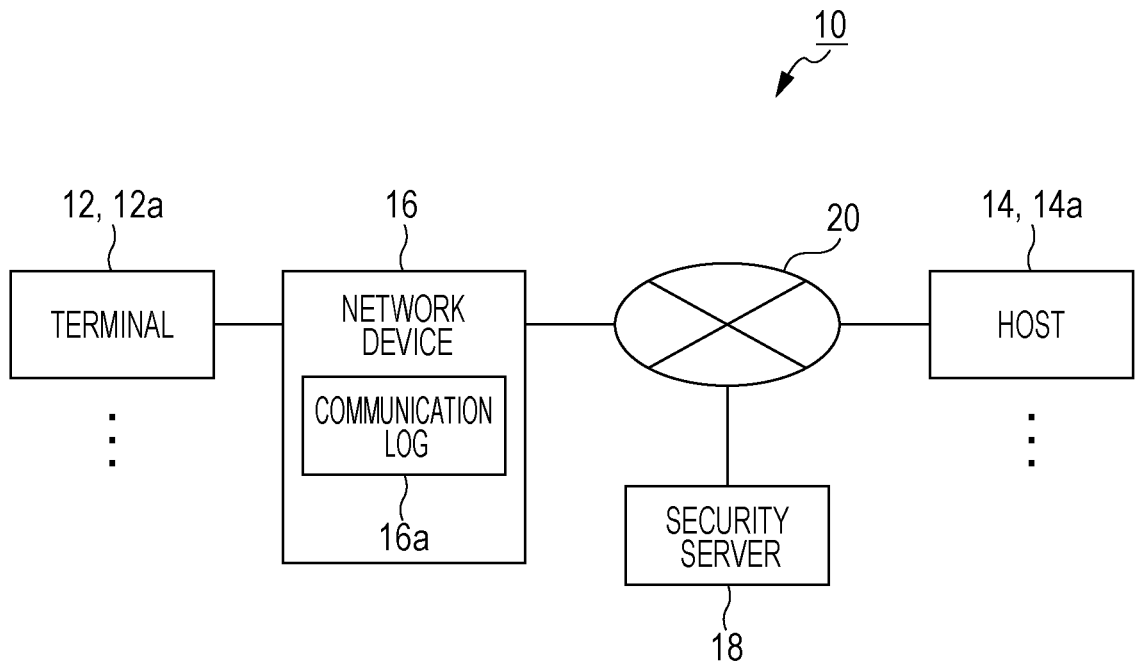

INFORMATION PROCESSING APPARATUS AND NON-TRANSITORY COMPUTER READABLE MEDIUM FOR DETECTING UNAUTHORIZED ACCESS

CROSS-REFERENCE TO RELATED APPLICATIONS

This application is based on and claims priority under 35 USC 119 from Japanese Patent Application No. 2020-094038 filed May 29, 2020.

BACKGROUND

(i) Technical Field

The present disclosure relates to an information processing apparatus and a non-transitory computer readable medium.

(ii) Related Art

Malware, which is a portmanteau word of "malicious" and "software", is known. A terminal infected with malware may involuntarily access various hosts against the will of the user of the terminal. Such access may be called unauthorized access or unauthorized communication in this specification.

A technology for detecting whether a terminal is infected with malware has been proposed. As an example of the technology, Japanese Unexamined Patent Application Publication No. 2018-133004 discloses the following abnormality detection system. This system detects whether an Internet of things (IoT) terminal which makes access to a host is infected with malware, based on the feature, such as the frequency of communication between the IoT terminal and hosts or the number of types of hosts. As another example of the above-described technology, Japanese Patent No. 6078179 discloses the following security threat detection system. In this system, a learning machine learns the patterns of security attack access based on header information concerning a security attack packet (malicious packet) transmitted on a network, thereby detecting a security attack packet.

SUMMARY

It is possible that a terminal infected with malware connect to various types of hosts in various communication modes. It is thus difficult to define in advance what types of hosts are accessed by a terminal infected with malware and in which communication modes hosts are accessed. It is also difficult to cause a learning machine to learn such communication modes. Unauthorized access may thus be hard to detect based on the communication mode in which a terminal infected with malware is likely to perform. To put it more specifically, when access is made from a terminal, it may be difficult to judge whether this access is unauthorized access from a terminal infected with malware.

Aspects of non-limiting embodiments of the present disclosure relate to detecting unauthorized access from a terminal.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to detect unauthorized access from a subject terminal to a subject host as a result of inputting subject input data into an autoencoder, an Internet protocol address of the subject terminal and an Internet protocol address of the subject host being used as at least part of the subject input data, the autoencoder having performed learning by using learning data, an Internet protocol address of a terminal and an Internet protocol address of a host to which the terminal has connected being used as at least part of the learning data.

BRIEF DESCRIPTION OF THE DRAWINGS

An exemplary embodiment of the present disclosure will be described in detail based on the following figures, wherein:

FIG. 1 is a block diagram illustrating a network system according to the exemplary embodiment;

FIG. 2 illustrates an example of a communication log;

DETAILED DESCRIPTION

Figure 3:
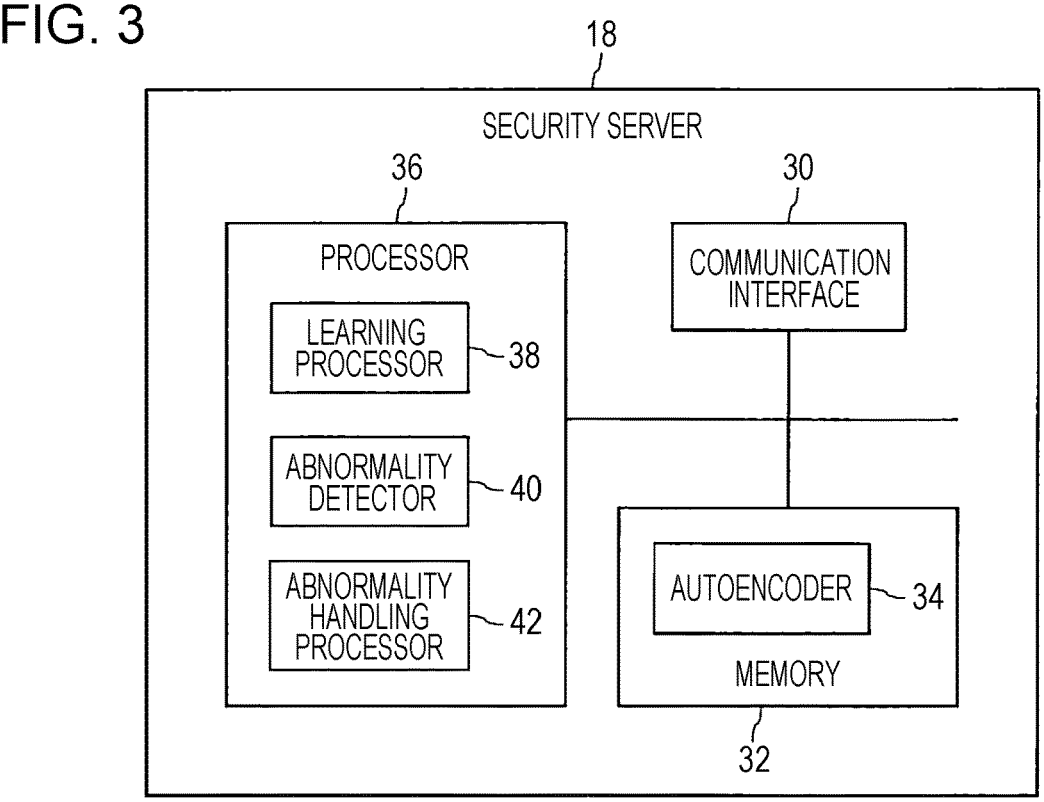
FIG. 3 is a schematic diagram illustrating a security server according to the exemplary embodiment.

FIG. 1 is a block diagram illustrating a network system 10 according to an exemplary embodiment of the disclosure. The network system 10 includes one or plural terminals 12, one or plural hosts 14, a network device 16, and a security server 18, which serves as an information processing apparatus according to an exemplary embodiment of the disclosure. Hereinafter, an explanation will be given, assuming that plural terminals 12 and plural hosts 14 are provided in the network system 10. A terminal 12 accesses and connects to a host 14. The terminals 12 and the network device 16 are connected with each other via an intranet, such as a local area network (LAN), so that they can communicate with each other. The hosts 14, the network device 16, and the security server 18 are connected with each other via a communication network 20, such as the Internet and a LAN, so that they can communicate with each other.

The terminals 12 are personal computers (PCs), for example, and are used by corresponding users. The terminals 12 may be mobile terminals, such as a tablet terminal, or an Internet of things (IoT) terminal. Each terminal 12 includes a communication interface, memory devices, such as a hard disk, a read only memory (ROM), and a random access memory (RAM), a display, such as a liquid crystal display, an input interface, such as a mouse and a keyboard or a touchscreen, and a processor, such as a central processing unit (CPU) or a microcomputer. The communication interface is used when the terminal 12 communicates with the network device 16 or accesses a host 14 via the network device 16.

There is a risk that the terminals 12 may be infected with malware. Malware is a portmanteau word of "malicious" and "software" and is malicious software or code intentionally designed to cause damage to the terminals 12. It is possible that malware invade a terminal 12 via various routes. For example, a host 14, which is a threat, sends malware to a terminal 12 so that the terminal 12 becomes infected with malware. Or, as a result of connecting an external storage medium, such as a universal serial bus (USB) memory, infected with malware to a terminal 12, the terminal 12 may become infected with malware.

The hosts 14 may be a single server, such as a web server, which provides various items of data, such as webpage data, to a device having accessed the server via the communication network 20. Thanks to the technology called virtual hosting, the multiple hosts 14 may be defined in a virtual manner by using one server.

The network device 16 is interposed between the terminals 12 and the hosts 14 on a communication path. The network device 16 executes various processing when a terminal 12 is accessing and communicating with a host 14. For example, when the user of a terminal 12 has specified the uniform resource locator (URL) of a host 14 so as to access the host 14, the network device 16 sends a fully qualified domain name (FQDN), such as "www.fujixerox.co.jp", which is the domain name of the host 14, included in the URL to a domain name system (DNS) server, which is not shown. Then, the DNS server can execute name resolution.

Upon receiving the FQDN from the network device 16, the DNS server executes name resolution processing concerning the FQDN so as to identify the Internet protocol (IP) address of the host 14 represented by the FQDN. The DNS server is a full-service resolver. The DNS server may execute name resolution processing only by itself or with one or multiple name servers (not shown), which are authoritative servers. The DNS server sends the identified IP address of the host 14 to the network device 16. Upon receiving the IP address of the host 14, the network device 16 can access the host 14 based on the IP address.

Instead of inputting the URL of the host 14, the user of the terminal 12 may directly input the IP address of the host 14. In this case, the above-described name resolution is not necessary, and the network device 16 accesses the host 14 based on the IP address received from the terminal 12.

The network device 16 also executes processing to ensure the security when the terminal 12 communicates with the host 14 via the communication network 20. For example, the network device 16 has a firewall or an intrusion prevention system (IPS). The firewall or the IPS verifies data, such as a packet, sent from the host 14, and if the data is found to be improper data, which causes or may cause damage to the terminal 12, the firewall or the IPS disconnects communication between the terminal 12 and the host 14.

Every time the terminal 12 and the host 14 communicate with each other, a communication log 16a, which is the history of this communication, is stored in the network device 16. In the exemplary embodiment, every time one communication session is performed, information, such as Internet control message protocol (ICMP) session information, is stored as the communication log 16a. The ICMP session information is information included in the IP header and the ICMP message of the payload of an Ethernet frame.

FIG. 2 illustrates an example of the communication log 16a corresponding to one communication session. The communication log 16a includes items of information concerning the time and date, time zone, IP address of a terminal 12, IP address of a host 14, and assignee country of the IP address of the host 14. The time and date indicates those at and on which the terminal 12 has accessed the host 14, namely, the time at which the terminal 12 and the host 14 have started to communicate with each other. The time zone indicates the period of time for which the terminal 12 has connected to the host 14. In the exemplary embodiment, the time zone can take values from 0 to 23. For example, if the time zone is "1", it indicates that the terminal 12 and the host 14 have communicated during the period from 1:00 to 2:00. As the time zone, "morning hours", "evening hours", and "working hours", for example, may be set. Information concerning the assignee country of the IP address of the host 14 may be obtained as a result of the network device 16 querying "Whois", which is a query and response service storing the registered users and assignee countries of the individual IP addresses.

In the exemplary embodiment, the network device 16 is connected to the plural terminals 12 and obtains the communication log 16a concerning communication between each terminal 12 and a corresponding host 14 and also executes processing to ensure the security for communication between each terminal 12 and a corresponding host 14.

The security server 18 is constituted by a server computer, for example, and detects unauthorized access (communication) from a terminal 12. That is, the security server 18 detects involuntary access from a terminal 12 infected with malware to a host 14 against the will of the user of the terminal 12. That is, it can be said that, when the security server 18 has detected unauthorized access from a certain terminal 12, this terminal 12 is infected with malware. In other words, the security server 18 is able to detect whether a terminal 12 is infected with malware.

FIG. 3 is a schematic diagram illustrating the security server 18. The individual elements of the security server 18 will be explained below with reference to FIG. 3.

A communication interface 30 includes a network adapter, for example. The communication interface 30 has a function of communicating with another device, such as the network device 16, via the communication network 20.

A memory 32 includes a hard disk, a solid state drive (SSD), a ROM, or a RAM, for example. The memory 32 may be provided separately from a processor 36, which is discussed later, or be at least partially provided within the processor 36. An information processing program for operating the individual elements of the security server 18 is stored in the memory 32. An autoencoder 34 is stored in the memory 32, as shown in FIG. 3.

Figure 4:
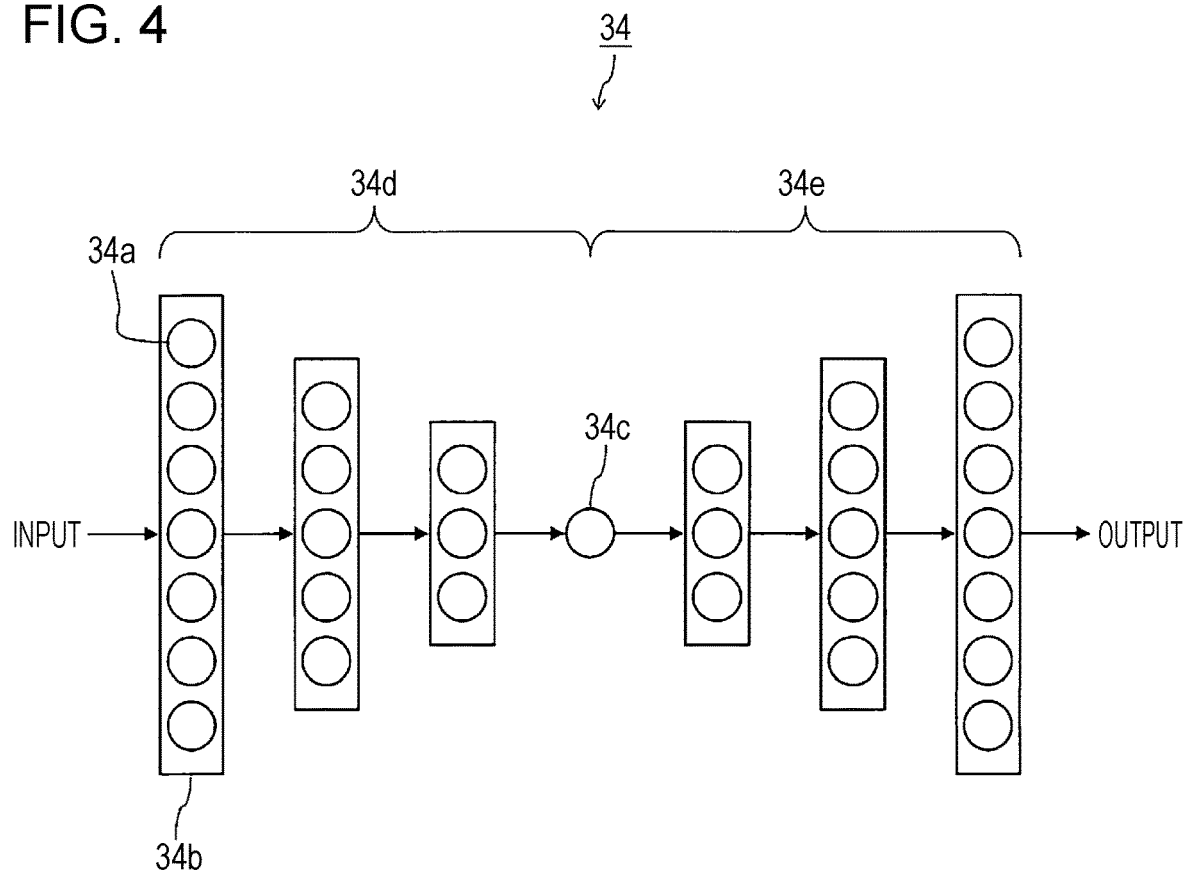
FIG. 4 illustrates the structure of an autoencoder.

The autoencoder 34 is a learning unit. A model of the autoencoder 34 is shown in FIG. 4. The autoencoder 34 is constituted by multiple layers 34b, each of which includes multiple neurons 34a. The autoencoder 34 includes an encoder 34d and a decoder 34e. The encoder 34d reduces the dimensionality of input data (compresses the features of input data) so as to extract a compressed feature vector 34c representing the features of input data. The decoder 34e expands the dimensionality from the compressed feature vector 34c so as to reconstruct and output the original input data. The encoder 34d and the decoder 34e are each constituted by multiple layers 34b. In the encoder 34d, the number of neurons 34a included in the layer 34b, that is, the dimensionality of data, is gradually decreased in the direction from the layer 34b closer to the input side toward the layer 34b on the deeper side. In the decoder 34e, the number of neurons 34a included in the layer 34b is gradually increased in the direction from the layer 34b closer to the feature vector 34c to the layer 34b closer to the output side. In each of the encoder 34d and the decoder 34e, all the neurons 34a included in a layer 34b are coupled with those in an adjacent layer 34b. The actual entity of the autoencoder 34 is constituted by a program which defines the structure of the autoencoder 34, various parameters regarding the autoencoder 34, and a processing execution program for executing processing on input data. Accordingly, storing the autoencoder 34 in the memory 32 means storing the above-described programs and parameters in the memory 32. Details of learning processing executed by the autoencoder 34 will be discussed later, together with an explanation of processing executed by a learning processor 38.

As shown in FIG. 3, the processor 36 implements the functions as a learning processor 38, an abnormality detector 40, and an abnormality handling processor 42 as a result of executing the information processing program stored in the memory 32.

The learning processor 38 executes learning processing for causing the autoencoder 34 to perform learning based on learning data. As the learning data, data based on the communication logs 16a received from the network device 16 is used.

The learning processor 38 first converts information included in the communication log 16a into a format suitable to be learning data used by the autoencoder 34. More specifically, the learning processor 38 sequentially links the numeric values of individual segments (also called octets in IPv4) of the IP address of the terminal 12 and those of the IP address of the host 14 included in the communication log 16a, and sets the linked numeric values as learning data. For example, if the communication log 16a is represented by the content shown in FIG. 2, the learning data results in "192, 168, 183, 190, 192, 168, 180, 22", which is a combination of the IP address of the terminal 12 and that of the host 14. That is, the IP address of the terminal 12 and that of the host 14 are used as the learning data.

As the learning data, at least one of information indicating the time zone and that of the assignee country of the IP address of the host 14 included in the communication log 16a may also be used. In this case, information indicating the time zone and/or that of the assignee country are linked with the above-described combination of the IP address of the terminal 12 and that of the host 14. In the exemplary embodiment, the learning data is constituted by information indicating the time zone, the IP address of the terminal 12, the IP address of the host 14, and information indicating the assignee country of the IP address of the host 14. For example, if the communication log 16a is represented by the content shown in FIG. 2, the learning data results in "1, 192, 168, 183, 190, 192, 168, 180, 22, jp".

In the above-described learning processing, as many samples of learning data as the communication logs 16a stored in the network device 16 are generated. By using the generated samples of learning data, the learning processor 38 causes the autoencoder 34 to perform learning.

Prior to inputting of the learning data into the autoencoder 34, the learning processor 38 creates a dictionary from the learning data. The learning processor 38 first stores, as dictionary data, the numeric values corresponding to the values represented by the learning data in the memory 32, and then creates a dictionary from the learning data based on the dictionary data stored in the memory 32. For example, the learning processor 38 converts the time zone "1" into the numeric value "1", the time zone "2" into the numeric value "2", and the assignee country "jp" of the IP address of the host 14 into the numeric value "701". Regarding each segment of the IP address, even if a segment of the IP address of the terminal 12 and that of the host 14 have the same numeric value, the learning processor 38 converts the same numeric value of the IP address of the terminal 12 and that of the host 14 into different numeric values so that two different segments can be distinguished from each other. For example, the numeric value "192" included in the IP address of the terminal 12 is converted into the numeric value "215" and that in the IP address of the host 14 into the numeric value "471". For the purpose of easy understanding, the exemplary embodiment is discussed such that information indicating the time zone, the IP addresses, and information indicating the assignee country are directly input into the autoencoder 34. In actuality, however, the numeric values formed as a dictionary converted from the items of information are input into the autoencoder 34.

When the learning processor 38 has input learning data into the autoencoder 34 as input data, the encoder 34d of the autoencoder 34 extracts the compressed feature vector 34c from the features of the input data, and then, the encoder 34e reconstructs the input data from the feature vector 34c and outputs the input data (see FIG. 4). The learning processor 38 causes the autoencoder 34 to perform learning based on the difference between the input data input into the autoencoder 34 and the output data output from the autoencoder 34.

As a result of the learning processor 38 repeating the above-described learning processing, the autoencoder 34 learns the features of input data. Then, if another input data input into the autoencoder 34 indicates features learned by the autoencoder 34, the autoencoder 34 is able to reconstruct this input data based on the compressed feature vector 34c extracted from the input data and output the reconstructed input data as output data. That is, if the features of input data are those learned by the autoencoder 34, the autoencoder 34 is able to output the input data as output data. In other words, if the features of input data are not those learned by the autoencoder 34, the autoencoder 34 is unable to reconstruct this input data and output it as output data. In this case, the output data does not match the input data.

Under the normal conditions, that is, when a terminal 12 is not infected with malware, it tends to access specific plural hosts 14. One of the reasons for this is that the user of a terminal 12 is likely to act according to a specific behavior pattern. A combination of the IP address of a terminal 12 and that of a host 14 can thus represent the features of communication performed by the terminal 12. More appropriately, a combination of the IP address of a terminal 12, that of a host 14, the time zone, and the assignee country of the IP address of the host 14 represents the features of communication performed by the terminal 12. It can thus be said that the autoencoder 34, which performs learning by using the above-described learning data, learns the features of communication frequently performed by the terminal 12.

As identification information for identifying a terminal 12 and a host 14, various types of information may be used. Instead of the IP address of a terminal 12 and that of a host 14, another identification information may be used as part of learning data. To execute learning processing, a suitable number of learning elements is required as learning data. If learning elements are too few, the learning efficiency in the autoencoder 34 is lowered. In contrast, too many learning elements may increase the burden on the autoencoder 34 to execute learning processing. The IP address is expressed by four or eight segments, that is, four or eight learning elements, which is a suitable number for performing learning. Among various types of identification information, the IP address can thus be suitably used as part of learning data for the autoencoder 34.

The IP address also serves as information representing the similarity between terminals 12 or between hosts 14. Taking an IPv4 IP address as an example, if, concerning the IP addresses of two terminals, the first through third segments are identical and the fourth segments are slightly different from each other, these two terminals may have similar features. It is now assumed that a terminal 12 infected with malware accesses a first host 14. In this case, if the first through third segments of the IP address of a second host 14 are identical to those of the first host 14 and only the fourth segment is slightly different from that of the first host 14, it is likely that the second host 14 is also a threat. Additionally, concerning two terminals 12, if the first through third segments are identical to each other and only the fourth segments are slightly different, these two terminals 12 may have similar features regarding communication. Using IP addresses as learning data thus enables the autoencoder 34 to perform learning while taking the similarity between terminals 12 or between hosts 14 into consideration.

As stated above, the autoencoder 34 performs learning based on the difference between input data and output data. However, data input into the autoencoder 34 as learning data is not appended with a label indicating whether this input data concerns unauthorized access. The autoencoder 34 thus performs learning in an unsupervised manner.

A terminal 12 is subjected to judgement whether unauthorized access is made from this terminal 12 (such a terminal 12 will be called a subject terminal 12a). Based on the communication log 16a regarding access from this subject terminal 12a, as a result of executing processing similarly to the learning processor 38, the abnormality detector 40 first generates input data indicating the numeric values of the individual segments of the IP address of the subject terminal 12a and those of a host 14 to which the subject terminal 12a has connected (hereinafter such a host 14 will be called a subject host 14a) linked with each other. Such input data will be called subject input data. If the autoencoder 34 has performed learning with learning data to which information indicating the time zone is attached, the abnormality detector 40 generates, based on the communication log 16a, subject input data indicating information about the time zone, the numeric values of the individual segments of the IP address of the subject terminal 12a, and those of the subject host 14a linked with each other. If the autoencoder 34 has performed learning with learning data to which information indicating the assignee country of the IP address of the subject host 14a is attached, the abnormality detector 40 generates, based on the communication log 16a, subject input data indicating the numeric values of the individual segments of the IP address of the subject terminal 12a, those of the subject host 14a, and information about the assignee country of the IP address of the subject host 14a linked with each other. In the exemplary embodiment, the abnormality detector 40 generates subject input data indicating information about the time zone, the numeric values of the individual segments of the IP address of the subject terminal 12a, those of the subject host 14a, and information about the assignee country of the IP address of the subject host 14a linked with each other.

The abnormality detector 40 inputs the generated subject input data into the autoencoder 34, which has completed learning, and compares of this subject input data with output data output from the autoencoder 34. Output data obtained from the autoencoder 34 in response to subject input data into the autoencoder 34 will be called subject output data. Based on the comparison result, the abnormality detector 40 detects whether unauthorized access is made from the subject terminal 12a.

As stated above, the autoencoder 34 has learned the features of communication frequently performed by a terminal 12. If the subject input data concerning a terminal 12 input into the autoencoder 34 indicates features learned by the autoencoder 34, the resulting subject output data becomes equivalent to the subject input data. That is, if the features of communication represented by the subject input data are the same as those of communication performed by a terminal 12 which have been learned by the autoencoder 34, that is, the same as the "usual" features of the terminal 12, the autoencoder 34 is able to output subject output data equivalent to the subject input data. In contrast, if the features of communication represented by the subject input data are different from those learned by the autoencoder 34, the subject output data from the autoencoder 34 does not become equivalent to the subject input data.

In the exemplary embodiment, the autoencoder 34 has performed learning with the IP addresses of the terminals 12 and hosts 14 as part of learning data. Likewise, the subject input data also indicates the IP address of a subject terminal 12a and that of a subject host 14a. Hence, if, while taking the similarity between the IP addresses of terminals 12 or hosts 14 into consideration, the features of communication represented by the subject input data are found to be similar to those of communication performed by a terminal 12 which have been learned by the autoencoder 34, the autoencoder 34 is able to output subject output data equivalent to the subject input data.

Based on comparison between the subject input data and the subject output data, the abnormality detector 40 judges whether the features of communication represented by the subject input data are similar to those of "usual" communication performed by the subject terminal 12a. If the two types of features are different from each other, the abnormality detector 40 assumes that access from the subject terminal 12a is unauthorized access. In this manner, it is possible to detect unauthorized communication (access) from a subject terminal 12a without the need to define or learn a communication mode of unauthorized access in advance.

Details of processing executed by the abnormality detector 40 will be described below. As well as the learning processor 38, prior to inputting of subject input data into the autoencoder 34, the abnormality detector 40 also creates a dictionary from the subject input data.

Figure 5:
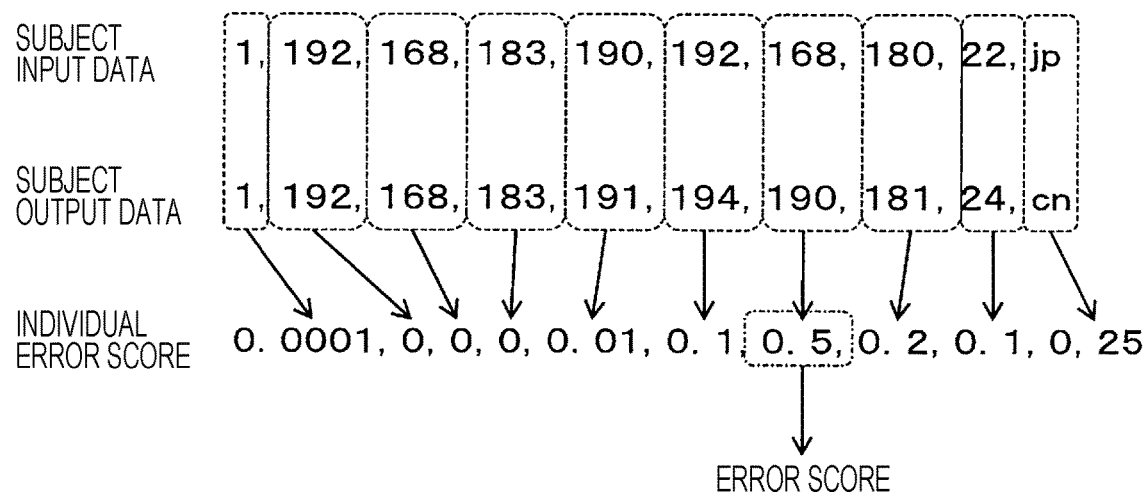
FIG. 5 illustrates an example of an error score calculated based on comparison between subject input data and subject output data.

FIG. 5 illustrates an example of subject input data input into the autoencoder 34, which has completed learning, and that of subject output data output from the autoencoder 34 in response to the subject input data. The abnormality detector 40 compares the subject input data and the subject output data and then calculates the error score representing the difference between the subject input data and the subject output data.

More specifically, the abnormality detector 40 compares individual items of information represented by the subject input data and those by the subject output data, that is, information indicating the time zone, individual segments of the IP address of the subject terminal 12a, those of the subject host 14a, and the assignee country of the IP address of the subject host 14a represented by the subject input data and those by the subject output data. Based on the comparison results, the abnormality detector 40 calculates an individual error score for each item of information. For example, as shown in FIG. 5, upon comparing the time zone "1" represented by the subject input data and the time zone "1" represented by the subject output data, the abnormality detector 40 calculates the individual error score to be "0.0001", which indicates the difference between the time zone represented by the subject input data and that by the subject output data. The abnormality detector 40 also compares the first segment "192" of the IP address of the subject host 14a represented by the subject input data and the first segment "194" represented by the subject output data, and calculates the individual error score to be "0.1", which indicates the difference therebetween.

To calculate individual error scores, various calculation methods may be employed, and a desired method can be used. In the exemplary embodiment, individual error scores are calculated such that, as the difference between subject input data and subject output data is greater, the individual error scores also become greater, and as the difference between subject input data and subject output data is smaller, the individual error scores also become smaller.

To calculate individual error scores for the IP address of a subject terminal 12a indicated by subject input data and that by subject output data, different calculation methods may be applied to the segments of the IP address. This will be explained more specifically. It is assumed that, in a first case, the difference between a higher segment (the first segment, for example) of the IP address of the subject terminal 12a indicated by the subject input data and that by the subject output data is "1", and in a second case, the difference between a lower segment (the fourth segment, for example) of the IP address of the subject terminal 12a indicated by the subject input data and that by the subject output data is also "1". Although the difference in the first case and that in the second case are the same value "1", the similarity between the IP address of the subject terminal 12a indicated by the subject input data and that by the output data for the first case is lower than that for the second case. For example, the similarity between the IP address "192. 168. 183. 190" and the IP address "194. 168. 183. 190" is lower than that between the IP address "192. 168. 183. 190" and the IP address "192. 168. 183. 192". In other words, the difference between the subject input data and the subject output data becomes greater when a difference is found in the numeric value of a higher segment of the IP address indicated by subject input data and that by subject output data than when the same difference is found in the numeric value of a lower segment of the IP address indicated by subject input data and that by subject output data.

The abnormality detector 40 thus calculates individual error scores so that an individual error score becomes greater when a difference is found in the numeric value of a higher segment of the IP address than when the same difference is found in the numeric value of a lower segment of the IP address. To calculate individual error scores in this manner, the abnormality detector 40 makes adjustments or uses different calculation methods in accordance with the segments. For example, when the individual error score is "0.1" for the difference "1" in the numeric value of a lower segment, the individual error score for the same difference "1" in the numeric value of a higher segment is increased to be "0.3".

Likewise, concerning the difference between the IP address of the subject host 14a represented by the subject input data and that by the subject output data, the abnormality detector 40 may also calculate individual error scores so that an individual error score becomes greater when a difference is found in the numeric value of a higher segment than when the same difference is found in the numeric value of a lower segment.

Based on the multiple individual error scores calculated for the individual items of information represented by the subject input data and those by the subject output data, the abnormality detector 40 calculates the error score representing the overall difference between the entire subject input data and the entire subject output data. In the exemplary embodiment, the highest value of the individual error scores calculated between the subject input data and the subject output data is set to be the error score indicating the overall difference therebetween. In the example in FIG. 5, the individual error score "0.5" between the second segment "168" of the IP address of the subject host 14a indicated by the subject input data and the second segment "190" of the IP address of the subject host 14a indicated by the subject output data is the highest value. Accordingly, the error score representing the overall difference between the subject input data and the subject output data is set to be "0.5". Another approach may be taken to calculate the error score as long as the error score becomes higher as the difference between subject input data and subject output data is greater. For example, the average of multiple individual error scores may be used as the overall error score.

In the above-described manner, the abnormality detector 40 inputs plural items of subject input data concerning a subject terminal 12a into the autoencoder 34, which has completed learning, and calculates the error score indicating the difference between each item of subject input data and the associated item of subject output data. Based on the multiple error scores calculated in this manner, the abnormality detector 40 judges whether access from the subject terminal 12a is unauthorized access, in other words, whether the subject terminal 12a is infected with malware.

To detect unauthorized access from a subject terminal 12a based on multiple error scores, various methods can be employed. In the exemplary embodiment, the abnormality detector 40 detects unauthorized access from a subject terminal 12a by executing the following processing.

Among multiple pairs of subject input data and subject output data, the abnormality detector 40 first extracts pairs for which the error score is greater than or equal to a predetermined threshold (0.2, for example). Then, by referring to the corresponding communication logs 16a, the abnormality detector 40 extracts information concerning the time and date, time zone, IP address of the subject terminal 12a, IP address of the subject host 14a, and assignee country of the IP address of the host 14a corresponding to each item of subject input data. Then, for each item of subject input data, the abnormality detector 40 generates an abnormality log including the extracted items of information from the communication log 16a and the error score calculated for these items of information.

Then, for each time window, which is a frame for a certain time (ten minutes, for example), the abnormality detector 40 calculates an evaluation score based on the error scores included in the generated abnormality logs. In the exemplary embodiment, the abnormality detector 40 calculates the evaluation score based on the measurement called perplexity. More specifically, the abnormality detector 40 sets the time window to be a certain time frame, and then calculates $-\log_2 P$ of the error score P included in each abnormality log within the set time window (the time and date indicated by the abnormality log is within this time window). The abnormality detector 40 then calculates the average of $-\log_2 P$ of the individual error scores P within the time window and sets the calculated average to be the evaluation score for this time window. As the evaluation score is higher, it is more likely that the subject input data concerning a subject terminal 12a is abnormal, that is, the difference between the features of communication represented by the subject input data and those of "usual" communication performed by this subject terminal 12a is greater.

The abnormality detector 40 calculates the above-described evaluation score for each time window by shifting the time window to a different time frame by degrees (by every minute). Based on the evaluation score for each time window, the abnormality detector 40 detects unauthorized access from the subject terminal 12a. For example, if a time window having an evaluation score greater than or equal to a certain threshold is continuously found a predetermined number of times, the abnormality detector 40 judges that access from the subject terminal 12a is unauthorized access.

Figure 6:
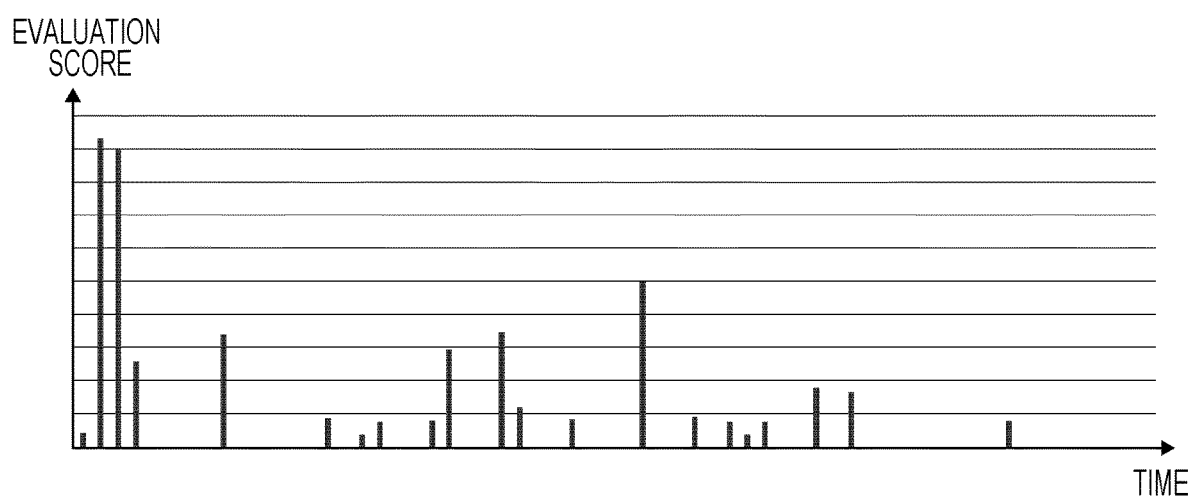
FIG. 6 is a graph illustrating an evaluation score.

The abnormality detector 40 may output the evaluation scores calculated for the individual time windows as a graph, such as that shown in FIG. 6. In the graph in FIG. 6, the horizontal axis indicates the start time or the end time of each time window, and the vertical axis indicates the evaluation score. The graph is checked by the administrator of the network device 16 or the administrator of multiple terminals 12. This enables the administrator to identify that access from a certain terminal 12 is unauthorized access, that is, the terminal 12 is infected with malware.

Returning to the explanation with reference to FIG. 3, in response to the abnormality detector 40 having detected unauthorized access from a terminal 12, the abnormality handling processor 42 executes various types of processing. For example, the abnormality handling processor 42 causes the network device 16 to block access from the terminal 12 and also sends an instruction to output a warning to the terminal 12. The abnormality handling processor 42 may also output a notification to the administrator of the network device 16 or to the administrator terminal used by the administrator of the multiple terminals 12.

While the exemplary embodiment has been discussed above, the disclosure is not restricted thereto. Various changes may be made to the exemplary embodiment without departing from the spirit and scope of the disclosure.

For example, in the exemplary embodiment, the autoencoder 34 performs learning under the control of the learning processor 38 of the security server 18. However, another device may cause the autoencoder 34 to perform learning, and then, the resulting autoencoder 34 may be stored in the memory 32. Additionally, although in the exemplary embodiment the functions such as the learning processor 38, the abnormality detector 40, and the abnormality handling processor 42 are integrated in the security server 18, they may be contained in the network device 16.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
   detect unauthorized access from a subject terminal to a subject host as a result of inputting subject input data into an autoencoder, an Internet protocol address of the subject terminal and an Internet protocol address of the subject host being used as at least part of the subject input data, the autoencoder having performed learning by using learning data, an Internet protocol address of a terminal and an Internet protocol address of a host to which the terminal has connected being used as at least part of the learning data,
   wherein the processor is further configured to:
   detect unauthorized access from the subject terminal based on an error score, the error score being calculated from an overall difference between the subject input data and subject output data, the subject output data representing output from the autoencoder in response to the subject input data; and
   calculate the error score so that the overall difference between the subject input data and the subject output data becomes greater when a difference is found between a higher segment of the Internet protocol address of the subject terminal indicated by the subject input data and the higher segment of the Internet protocol address of the subject terminal indicated by the subject output data than when the same difference is found between a lower segment of the Internet protocol address of the subject terminal indicated by the subject input data and the lower segment of the Internet protocol address of the subject terminal indicated by the subject output data or so that the overall difference between the subject input data and the subject output data becomes greater when a difference is found between a higher segment of the Internet protocol address of the subject host indicated by the subject input data and the higher segment of the Internet protocol address of the subject host indicated by the subject output data than when the same difference is found between a lower segment of the Internet protocol address of the subject host indicated by the subject input data and the lower segment of the Internet protocol address of the subject host indicated by the subject output data.

2. The information processing apparatus according to claim 1, wherein:
   information indicating a time zone in which the terminal has connected the host is also used as the learning data for the autoencoder to perform learning; and
   the processor is configured also to input the information indicating the time zone into the autoencoder as part of the subject input data.

3. The information processing apparatus according to claim 1, wherein:
   information indicating an assignee country of the Internet protocol address of the host is also used as the learning data for the autoencoder to perform learning; and
   the processor is configured also to input the information indicating the assignee country of the Internet protocol address of the host into the autoencoder as part of the subject input data.

4. The information processing apparatus according to claim 2, wherein:

information indicating an assignee country of the Internet protocol address of the host is also used as the learning data for the autoencoder to perform learning; and the processor is configured also to input the information indicating the assignee country of the Internet protocol address of the host into the autoencoder as part of the subject input data.

5. A non-transitory computer readable medium storing a program causing a computer to execute a process, the process comprising:

detecting unauthorized access from a subject terminal to a subject host as a result of inputting subject input data into an autoencoder, an Internet protocol address of the subject terminal and an Internet protocol address of the subject host being used as at least part of the subject input data, the autoencoder having performed learning by using learning data, an Internet protocol address of a terminal and an Internet protocol address of a host to which the terminal has connected being used as at least part of the learning data, wherein the process further comprising:

detecting unauthorized access from the subject terminal based on an error score, the error score being calculated from an overall difference between the subject input data and subject output data, the subject output data representing output from the autoencoder in response to the subject input data; and calculating the error score so that the overall difference between the subject input data and the subject output data becomes greater when a difference is found between a higher segment of the Internet protocol address of the subject terminal indicated by the subject input data and the higher segment of the Internet protocol address of the subject terminal indicated by the subject output data than when the same difference is found between a lower segment of the Internet protocol address of the subject terminal indicated by the subject input data and the lower segment of the Internet protocol address of the subject terminal indicated by the subject output data or so that the overall difference between the subject input data and the subject output data becomes greater when a difference is found between a higher segment of the Internet protocol address of the subject host indicated by the subject input data and the higher segment of the Internet protocol address of the subject host indicated by the subject output data than when the same difference is found between a lower segment of the Internet protocol address of the subject host indicated by the subject input data and the lower segment of the Internet protocol address of the subject host indicated by the subject output data.

6. An information processing method comprising:

detecting unauthorized access from a subject terminal to a subject host as a result of inputting subject input data into an autoencoder, an Internet protocol address of the subject terminal and an Internet protocol address of the subject host being used as at least part of the subject input data, the autoencoder having performed learning by using learning data, an Internet protocol address of a terminal and an Internet protocol address of a host to which the terminal has connected being used as at least part of the learning data, wherein the method further comprising:

detecting unauthorized access from the subject terminal based on an error score, the error score being calculated from an overall difference between the subject input data and subject output data, the subject output data representing output from the autoencoder in response to the subject input data; and calculating the error score so that the overall difference between the subject input data and the subject output data becomes greater when a difference is found between a higher segment of the Internet protocol address of the subject terminal indicated by the subject input data and the higher segment of the Internet protocol address of the subject terminal indicated by the subject output data than when the same difference is found between a lower segment of the Internet protocol address of the subject terminal indicated by the subject input data and the lower segment of the Internet protocol address of the subject terminal indicated by the subject output data or so that the overall difference between the subject input data and the subject output data becomes greater when a difference is found between a higher segment of the Internet protocol address of the subject host indicated by the subject input data and the higher segment of the Internet protocol address of the subject host indicated by the subject output data than when the same difference is found between a lower segment of the Internet protocol address of the subject host indicated by the subject input data and the lower segment of the Internet protocol address of the subject host indicated by the subject output data.

\* \* \* \* \*